UNITED STATES PATENT OFFICE.

CHARLES HOWARD, OF BROOKLYN, NEW YORK.

FIRE-EXTINGUISHING COMPOUND.

No. 879,171.

Specification of Letters Patent.

Patented Feb. 18, 1908.

Application filed April 10, 1905. Serial No. 254,810. Renewed June 25, 1907. Serial No. 380,751.

*To all whom it may concern:*

Be it known that I, CHARLES HOWARD, a citizen of the United States, and a resident of the city of Brooklyn, in the county of Kings and the State of New York, have made certain new and useful Improvements in Fire-Extinguishing Compounds, of which the following is a specification.

My invention relates to that class of fire extinguishing compounds that are soluble in an extinguishing fluid such as water.

It has been a common practice in the use of fire extinguishing means to employ in connection therewith water charged with an uninflammable gas such as carbon dioxid. The common method of charging the water with carbon dioxid consists in dissolving in the said water a suitable carbonate as carbonate of soda and subsequently decomposing the same with a suitable acid such as sulfuric acid, whereby carbon dioxid is liberated and thus charges the water. As distinguished from this old and well known method of providing a fire extinguishing fluid my invention comprehends the employment of a compound composed of such ingredients, that when the said compound is dissolved in water and the solution applied to a fire uninflammable gases will be evolved owing to the disassociation of the ingredients by means of the heat of combustion.

One of the substances which I use and which by means of heat is disassociated into an uninflammable gas or gases, belongs to that class of chemical compounds known as the alkaline carbonates. As types of this class may be mentioned sodium carbonate $(Na_2CO_3)$ and also ammonium carbonate $(NH_4)_2CO_3)$. These I have found to be particularly useful in connection with my compound owing to their solubility in water as well as the ease with which they are disassociated by heat, whereby carbon dioxid or carbon dioxid and ammonia gas are evolved as the case may be.

Another feature of my invention consists in the employment of hyposulfite of soda $(Na_2S_2O_3)$ in connection with my fire extinguishing compound. Hyposulfite of soda as is well known breaks up under the influence of heat. When this occurs more or less oxygen is absorbed from the surrounding atmosphere which in itself tends to prevent combustion at the point where the hyposulfite of soda is disassociated. Aside from this there is also formed a relatively large volume of sulfur dioxid $(SO_2)$ which is a valuable agent for the prevention of oxidation *i. e.* combustion.

I do not attempt to give the complicated chemical reactions indicative of the disassociation of hyposulfite of soda as I am unaware of a set of reactions that would specifically and clearly represent all of the various and complex changes that take place when this salt is broken up by means of heat. It is sufficient for the purposes of this specification as before set forth to state that when hyposulfite of soda is disassociated by heat, oxygen from the surrounding atmosphere is absorbed and among the compounds formed is sulfur dioxid.

My invention therefore consists of a fire extinguishing compound, composed of a mixture of hyposulfite of soda and an alkaline carbonate such as sodium carbonate or ammonium carbonate. I may however use two or more alkaline carbonates in connection with the hyposulfite of soda but generally I prefer to use simply the ammonium carbonate owing to the fact that under the influence of heat this latter salt breaks up into carbon dioxid, ammonia gas and water according to the following reaction which I believe to be correct

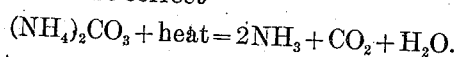
$$(NH_4)_2CO_3 + \text{heat} = 2NH_3 + CO_2 + H_2O.$$

Ammonia gas expands enormously under the influence of heat and for this reason is a most valuable agent in preventing combustion. For this reason it will readily be seen that carbonate of ammonia furnishes a most valuable addition to my compound.

The compound I prepare in the dry state and it is designed to be kept in this state when not in use. For this reason it will be clear that hyposulfite of soda in connection with a suitable alkaline carbonate or carbonates furnishes a compound admirably suited for the purpose in hand.

I preferably compress the ingredients of the compound into a suitable tablet or stick form whereby the various types of apparatus with which it can be used may be supplied with the minimum amount of trouble and labor and whereby the said compound may be readily transported.

In preparing the compound I grind or mix together three parts by weight of hyposulfite of soda and one part by weight of an alkaline carbonate as ammonium carbonate or sodium carbonate. After the mixing operation is completed I compress the mass into tablets or sticks of suitable dimensions or I may use the compound in the granulated or powder form.

It will be seen that my invention comprises a fire extinguishing compound that can be made, kept and transported in the dry state and which when subjected to the influence of the heat of a conflagration will in disassociation both absorb oxygen from the surrounding atmosphere and at the same time liberate an uninflammable gas or gases such as carbon dioxid or carbon dioxid and ammonia gas.

In using the compound a suitable amount of the mixture is dissolved in water in the proportion generally of one pound of the compound to five gallons of water. These proportions are not in any way fixed as any amount of the compound may be used that will be most suitable for the particular purpose. When used in the tablet or stick form the said tablet or stick may be supported within a suitable receptacle communicating with a water supply whereby the outgoing water may carry in suspension or solution a suitable amount of the extinguishing compound.

Having described my invention what I desire to claim and to secure by Letters Patent of the United States is as follows:—

1. A fire extinguishing compound consisting of hyposulfite of soda and an alkaline carbonate.

2. A fire extinguishing compound consisting of hyposulfite of soda and ammonium carbonate.

3. A fire extinguishing compound consisting of three parts by weight of hyposulfite of soda and one part by weight of ammonium carbonate.

In testimony that I claim the foregoing as my own, I affix my signature in the presence of two witnesses.

CHARLES HOWARD.

Witnesses:
L. T. SULLIVAN,
GEO. W. HOWARD.